Nov. 12, 1946.  M. M. BOTNICK  2,411,022
RETRACTABLE FRONT CARRIER ATTACHMENT FOR MOBILE CRANES
Filed Oct. 15, 1945  2 Sheets-Sheet 2

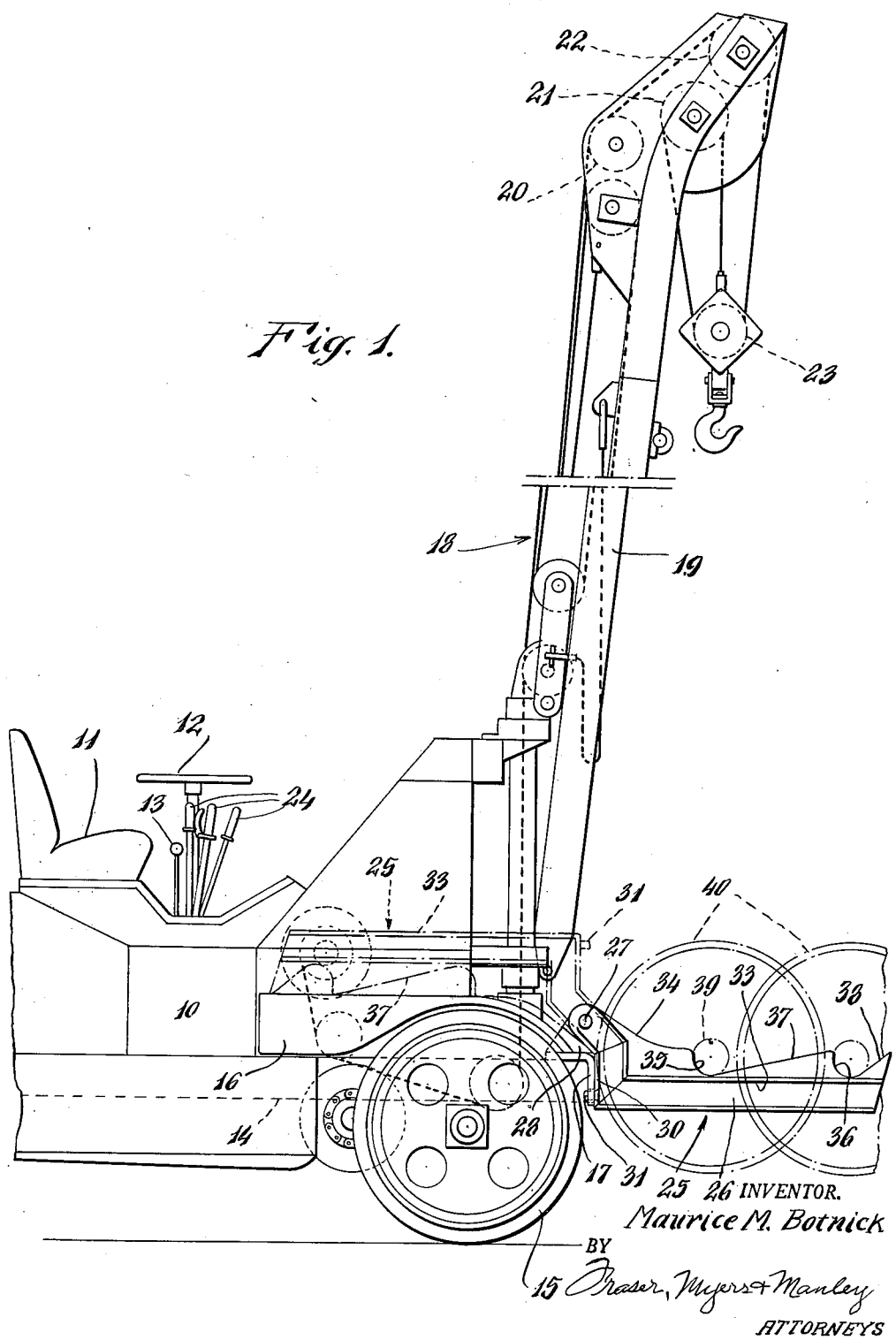

INVENTOR.
Maurice M. Botnick
BY
Fraser, Myers & Manley
ATTORNEYS

Patented Nov. 12, 1946

2,411,022

UNITED STATES PATENT OFFICE 2,411,022

RETRACTABLE FRONT CARRIER ATTACHMENT FOR MOBILE CRANES

Maurice M. Botnick, Brooklyn, N. Y., assignor to Silent Hoist & Crane Co., Brooklyn, N. Y., a partnership Application October 15, 1945, Serial No. 622,383

6 Claims. (Cl. 214—65)

1

The present invention relates to a retractable carrier attachment for a motor vehicle or the like, and more particularly to such attachment for the front of a mobile crane.

Mobile cranes, as is well known, are extensively used for transporting various heavy articles from place to place in industrial plants, railroad repair shops, shipyards and the like. In transporting such articles, they are lifted by the crane, and while supported thereby, are carried by the mobile vehicle upon which the crane is mounted, to their intended location. At times, the character of the articles to be transported is such as to make it more desirable to transport them upon a support so as to avoid the swinging motion of the suspended articles. Such mobile supports, however, are not always at hand, and where used, they are usually in the form of a trailer or of an independent mobile carrier, both of which devices require an investment in additional equipment with its concomitant maintenance and labor costs.

To overcome the objections above recited, I equip a mobile crane or other mobile vehicle with a simple, cheap, carrier attachment which, in use, extends forwardly of the vehicle, and which, when not in use, can be retracted or moved into a position which will not impair or hinder the utility of the vehicle for its otherwise normal functioning. To this end, my invention resides in providing at the front of a mobile crane, and preferably upon the front bumper of the vehicle carrying the crane, a pair of pivotally mounted arms which, in operative position, extend forwardly of the bumper against which they may be buttressed, and which, in inoperative position, extend rearwardly of the bumper and preferably are supported on the fenders of the front wheels of the vehicle. The invention will be better understood from the detailed description which follows, when considered in connection with the accompanying drawings, wherein:

Figure 1 is a side elevation of the front end of a mobile crane embodying my invention.

Figure 3:
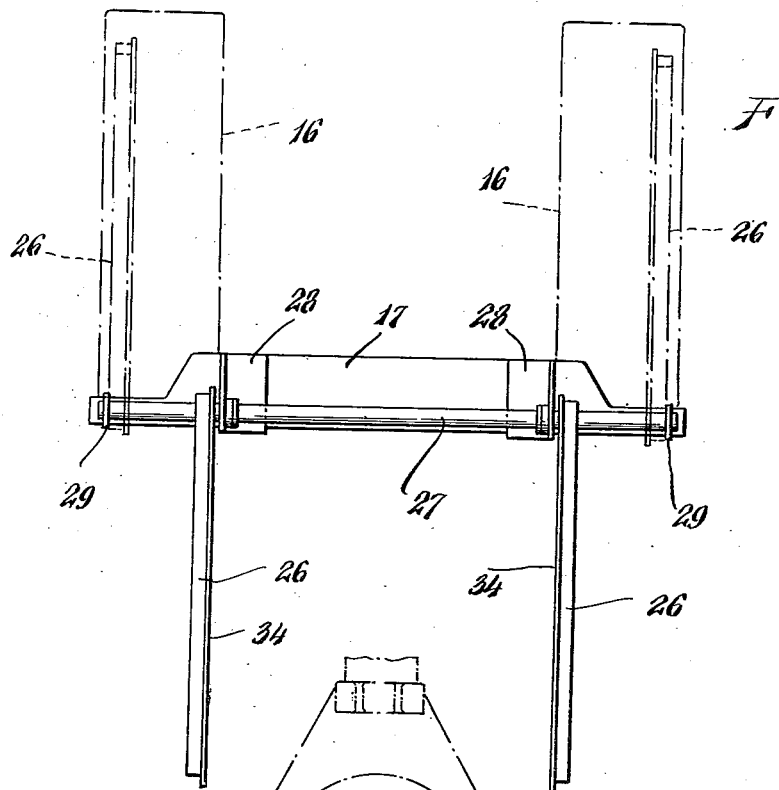
Fig. 3 is a top plan view of the carrier attachment with the parts thereof shown in both operative and inoperative positions.
Figure 2:
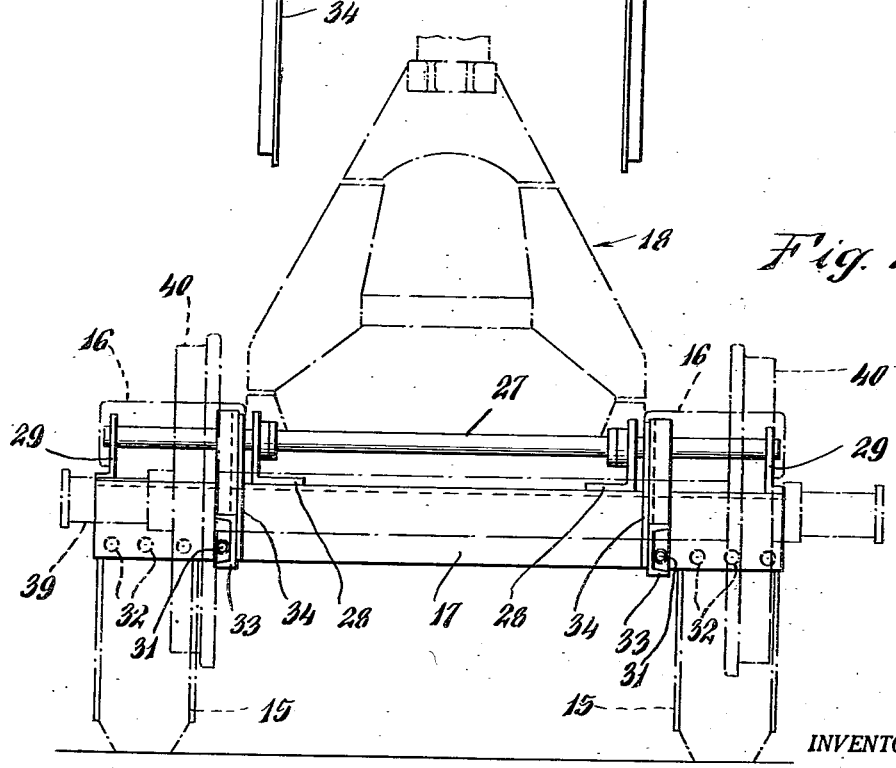
Fig. 2 is a front elevation of the mobile crane shown in Fig. 1, with certain parts thereof omitted.

Referring to the drawings, the reference numeral 10 indicates a mobile vehicle adapted to be driven by any source of motive power, having an operator's station 11, the usual vehicle control means 12, 13, a chassis frame 14, front wheels 15, and front wheel fenders 16. Rigidly mounted at the front end of the chassis or other suitable part at the front of the vehicle is a rigid bumper 17, herein shown as being of rightangular form in transverse section. Mounted on the vehicle forwardly of the operator's station is a crane, indicated generally by the reference character 18, said crane comprising a boom 19 having sheaves 20, 21 and 22 and a hoisting block 23, the crane being operable by the control levers 24 at the operator's station.

Mounted at the front end of the vehicle is a retractable carrier or article support, indicated generally by the reference character 25, said carrier consisting of a pair of angular arms 26 pivotally mounted upon a shaft 27, which, in turn, is supported by pairs of brackets 28 and 29, herein shown as rigidly mounted on the bumper 17. The mounting of the arms 26 on the shaft 27 is such that when the arms are disposed in operative article-supporting position they extend forwardly of the vehicle in a substantially horizontal position and have a wall 30 thereof bearing against and buttressed by the vertical wall of the angular bumper 17. In retracted position the arms, after being pivoted about the shaft 27, may be supported on the top face of the fenders 16 or upon any other suitable supports provided for said purpose on the vehicle.

By referring to Fig. 3 of the drawings it will be seen that the arms 26, in operative position, are disposed adjacent the brackets 28, whereas, in retracted position, they are disposed adjacent the brackets 29. In this connection it may be stated that the arms are slidable upon the portions of the shaft between the brackets 28 and 29 and are adapted to be held in various adjusted operative positions along said shaft portions through engagement of knobs or teats 31 carried by the arms within longitudinally spaced openings 32 in the vertical wall of the bumper. As will be obvious, the arms 26 may be formed in any desired manner, and as herein shown they consist of channel-shaped members 33 secured by welding or otherwise to flat plates 34. The arms 26 and plates 34 may be made in various forms, depending upon the character of the articles or of the load to be supported thereby. As shown in Fig. 1, the plates 34 are provided with recesses 35 and 36, which face upwardly when the arms are in operative position, and said recesses have inclined walls 37 and 38, respectively, for facilitating the reception and positioning of axles 39 on which car wheels 40 are mounted. If desired, the arms 26 may be formed to support a removable flooring, pallet or tote box, should it be intended that the retractable carrier be made to support boxes and the like.

In the operation of the mobile crane, the retractable carrier arms are normally in their retracted position resting upon the front wheel fenders as shown in broken lines in Figs. 1 and 3. When intended for use to transport articles from place to place, the arms are moved about their pivot shaft 27 to operative position shown in full lines in the various figures of the drawings, in which they are in full view of the operator's station 11 and the arms are held in adjusted position by the engagement of the knobs 31 within the openings 32. Now let it be assumed that it is desired to transport from one location in a railroad yard to another location, one or more axles having car wheels affixed thereon. The operator will drive the vehicle to the appropriate location, operate the crane to lift an axle and car wheels with the crane, and then lower said axle and car wheels into the upwardly facing aligned recesses in the arms, whereupon, on lowering the axle onto the inclined walls 37 of the recesses, the axle will roll and come to rest in the recesses 35. The mobile vehicle is then driven to the location at which the axle and wheels are to be set down, whereupon the crane will again be operated to lift the axle and wheels from the supporting attachment and deposit them at their intended place.

It will accordingly be appreciated from the foregoing disclosure that I have provide a simple, cheap and novel attachment for a mobile crane whereby the objects and advantages of the present invention may be carried out with ease and dispatch.

Although I have shown and described a preferred embodiment of my invention, I do not wish to be limited to the details of construction disclosed since these may be varied within the range of engineering and mechanical skill without departing from the spirit of my invention.

What I claim is:

1. In combination, a mobile vehicle having a rigid bumper extending transversely of the vehicle forwardly of the traction means thereof and rigidly mounted on the chassis of the vehicle, a pair of article supporting members pivotally mounted in spaced apart relation on the bumper and movable in transverse relation thereto, said members when in article supporting position extending substantially horizontally forwardly of the bumper and being buttressed thereby, and being movable about their pivots to an inoperative position in which they extend toward the rear of the vehicle and means on the vehicle for supporting the members in such inoperative position.

2. The combination according to claim 1 wherein the article supporting members are adjustable toward and away from each other and wherein there are cooperating means on the bumper and the supporting members for holding the latter in a plurality of adjusted relations when in article supporting position.

3. The combination according to claim 1 wherein the article supporting members are each formed with article receiving cradles which are in transverse alignment when the supporting members are in article supporting position.

4. In combination, a mobile vehicle, a boom crane carried by the vehicle, and a retractable carrier attachment for the vehicle, said vehicle having an operator's station for control of the vehicle and of the crane, said carrier attachment comprising a pair of arms pivotally mounted on a fixed rigid part at the front of the vehicle and adapted to be moved to an operative position extending substantially horizontally forwardly of the vehicle, and to an inoperative position extending toward the rear of the vehicle, said arms when in operative position being in unobstructed line of vision from the operator's station and said crane being operable to lift a load and deposit it onto said arms when in operative position.

5. The combination set forth in claim 4 wherein the arms are each formed with recesses which are in transverse alignment and face upwardly when the arms are in operative position to facilitate reception of the load when lowered onto the arms by the crane.

6. In combination with a mobile vehicle, of a retractable article-support comprising a pair of arms pivotally mounted in spaced apart relation on a fixed rigid part of the vehicle at the front thereof, said arms when in operative article-supporting position extending forwardly of the vehicle in a substantially horizontal position and being movable about their pivotal mounting to an inoperative position in which they extend toward the rear of the vehicle, said arms being each formed with an article-supporting cradle, said cradles being in transverse alignment when the arms are at article-supporting position.

MAURICE M. BOTNICK.